(No Model.) 2 Sheets—Sheet 1.

E. WESTON.
ELECTRICAL MEASURING APPARATUS.

No. 392,386. Patented Nov. 6, 1888.

WITNESSES:
Gustave Dieterich
Edgar Goodwin

INVENTOR
Edward Weston
BY Park Benjamin
His ATTORNEY (No Model.) 2 Sheets—Sheet 2.
E. WESTON.
ELECTRICAL MEASURING APPARATUS.
No. 392,386. Patented Nov. 6, 1888.
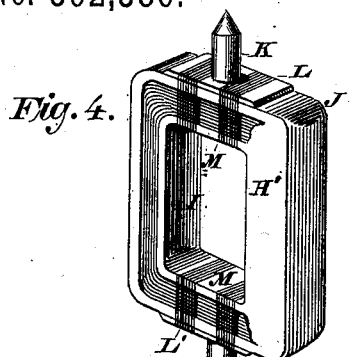
Fig. 4.
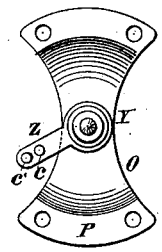
Fig. 5.
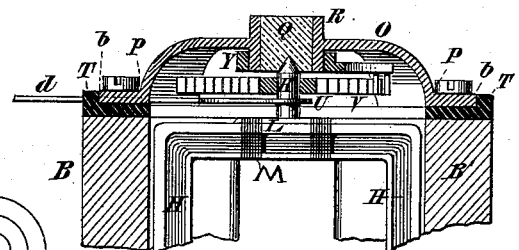
Fig. 3.
Fig. 6.
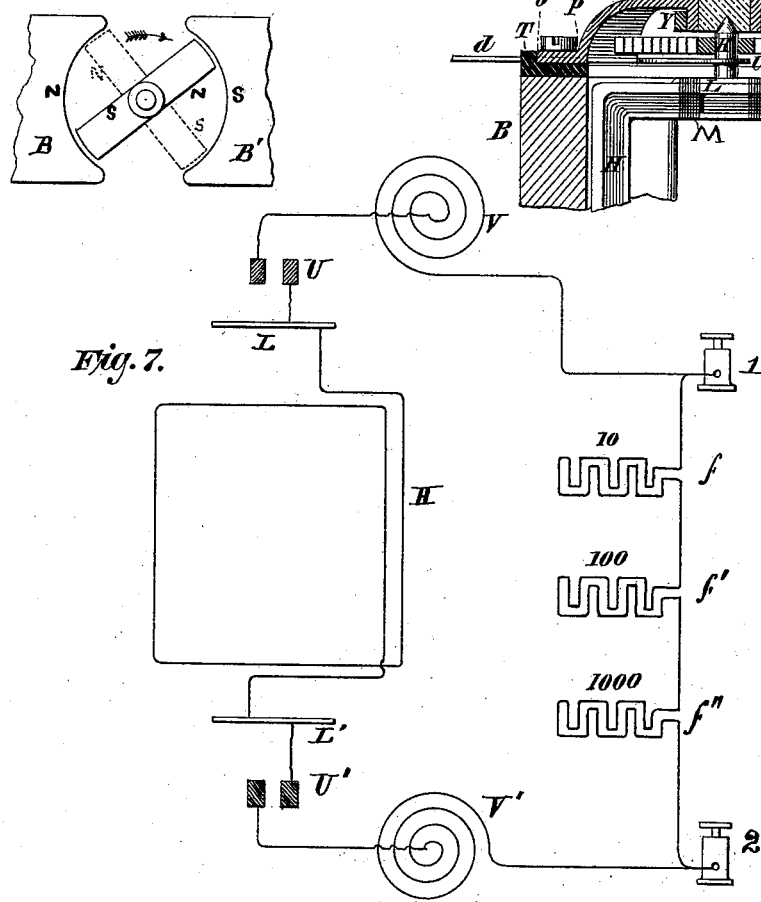
Fig. 7.
WITNESSES:
Gustave Dietrich
Edgar Goodwin
INVENTOR,
Edward Weston,
BY Park Benjamin
his ATTORNEY.

UNITED STATES PATENT OFFICE.

EDWARD WESTON, OF NEWARK, NEW JERSEY, ASSIGNOR TO THE WESTON ELECTRICAL INSTRUMENT COMPANY, OF SAME PLACE.

ELECTRICAL MEASURING APPARATUS.

SPECIFICATION forming part of Letters Patent No. 392,386, dated November 6, 1888.

Application filed April 14, 1888. Serial No. 270,636. (No model.)

*To all whom it may concern:*

Be it known that I, EDWARD WESTON, of Newark, Essex county, New Jersey, have invented a new and useful Improvement in Apparatus for the Measurement of Electricity, of which the following is a specification.

My apparatus is more particularly designed for the measurement of the strength of electrical currents in ampères. Its principle is as follows: To organize and construct an apparatus wherein the current to be measured in circulating through a coil or loop in the circuit, which coil is supported so as to be free to move in a uniform magnetic field, shall cause a movement of said coil due to the resultant effect thereupon of the said current and the magnet-poles; to oppose to the motion of said coil so produced a uniform resilient resistance, so that the extent of movement of said coil shall be directly proportional, or very nearly so, to the strength of the actuating-current, and to indicate the said strength in ampères upon a suitable scale; also, to prevent undue oscillation of the coil by combining therewith a mass of diamagnetic metal to which an intense magnetic field acts as a retarding medium, thereby producing a magnetic dash pot or brake, and to combine such diamagnetic mass with the said coil in such a way as to enable said mass to act to the maximum magnetic and mechanical advantage in checking said oscillation.

Figure 1:
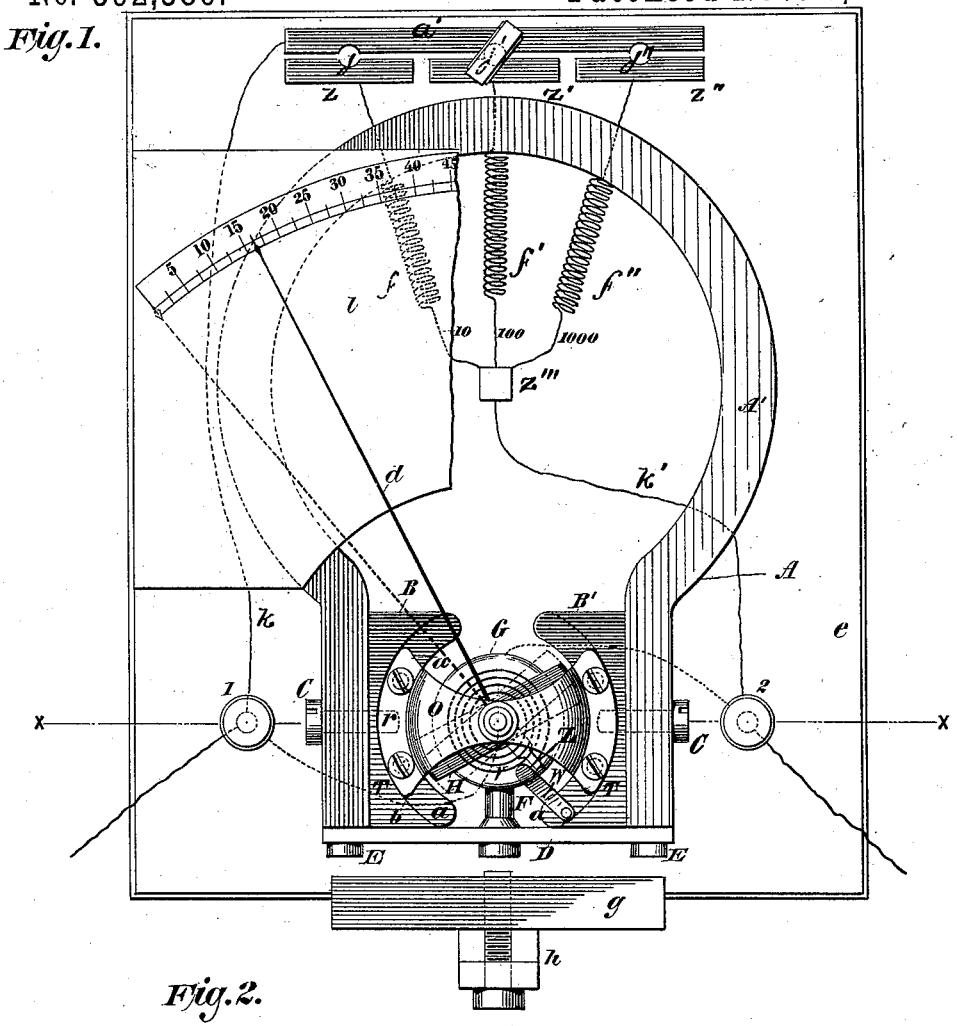
Figure 2:
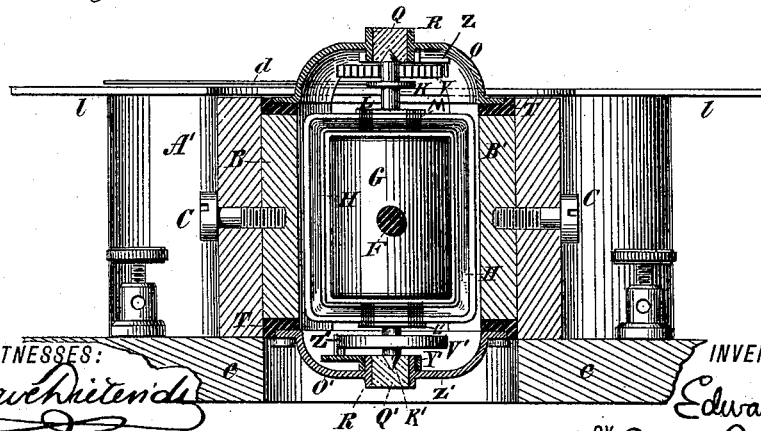

In the accompanying drawings, Figure 1 is a plan view of my new measuring-instrument with a portion of the scale-plate broken away. Fig. 2 is a section on the line *x x* of Fig. 1. Fig. 3 is a partial section on the same line on a larger scale than Fig. 2. Fig. 4 is a perspective view of the coil separately. Fig. 5 is a view of the inner side of one of the bridges O O'. Fig. 6 is a diagram illustrating the relative polarities of the coil H and magnet-poles B B'. Fig. 7 is a diagram showing the circuits in the instrument.

Similar letters of reference indicate like parts.

A is a permanent magnet, which is here shown as having a circular body, A', and polar extremities with their inner faces relatively flat and parallel. To said inner faces are attached pole-pieces B B' by means of screws C. The opposing faces of the pole-pieces B B' are concave, so that between said pole-pieces a substantially cylindrical opening is produced.

Extending across the ends of the magnet A is a bar, D, of brass or other diamagnetic material, which is secured to said magnet by bolts or screws E. Attached to the middle point of said bar D is a rod or pin, F, which supports a solid cylinder, G, of iron or other magnetic material. This cylinder is concentrically disposed with reference to the cylindrical space between the pole-pieces B B'. It is, however, both shorter and of less diameter than said cylindrical space, so that there is a free space at both its extremities, and an annular interval between its periphery and the concave faces of pole-pieces B B'.

H is a hollow coil of insulated wire, which incloses a frame, I, of copper or other diamagnetic metal, and is itself inclosed in a frame, J, of similar material, as shown in Fig. 4. The copper frame J is thicker than the copper frame I. Each side or face of the coil is covered with a plate of copper, one of which is shown broken away at H'. The whole coil H is therefore inclosed on all sides in an envelope of diamagnetic metal.

K K' are pivot-pins of metal, fixed to metal plates L L'. The plates L L' are secured to opposite ends of the frame J, as shown, by any insulating cement, or a layer of insulating material may be inserted between said plates and the metal frame J, and the said plates may be bound to the coil by wrappings, M, of silk thread. In fact, any mode of connecting the plates L L' and frame J may be adopted which shall not result in said frame forming a short circuit between said plates. One end of the wire composing the coil H connects to the plate L, and the other end of said wire to the plate L'.

At the ends of the pole-pieces B B' are formed recesses *a*, the shoulders *b* of which conform to the truly circular curve of the concave portions of said pole-pieces. O and O' are two precisely-similar bridges having a central elevated portion and flanged edges P. The curve of the outer periphery of the flanges P is truly circular. The flanges P enter the recesses *a*. Therefore the peripheries of said flanges correspond to and exactly fit against the curved inner shoulders, $b$, of the recesses $a$; but the curve of the shoulders $b$ and recesses $a$ correspond to the truly circular concavity in the faces of the pole-pieces B B'. Therefore it is necessary simply to adjust the flanges P of the bridges O O' in the recesses $a$, as described, to bring the central points of the two bridges O O' and the longitudinal axes of the fixed cylinder G in a straight line. At the central points of the bridges O O' are fixed sleeves R, which receive jewels Q, in which jewels the conical ends of the pivot-pins K' K' are received, and in which said pins freely turn. The fixed cylinder G then is supported in the hollow space inside of the inner frame, I, and the coil H, with its frames, surrounds said cylinder and turns in the annular space between the cylinder periphery and the pole-pieces B B'.

The advantage of the particular construction above set forth lies in the great ease with which it allows of exactly centering the coil H, for, as I have shown, when the bridge-flanges P meet the curved shoulders $b$ of the recesses $a$ the central points of the two bridges O O', and hence the pivot-bearings there located, come directly opposite each other, and in prolongation of the longitudinal axis of cylinder G, so that the constructor has merely to see that his recess-shoulders $a$ and flange-edges P are truly circular, and that the pivot-bearings are centrally located in the bridges O O', to be assured that the parts will come together when assembled with the pivot-bearings truly centered. It follows, also, that for all instruments of a certain size the parts may thus be made interchangeable and produced by milling or other machinery for automatically making exact reproductions—a result which, as is well known, materially reduces the cost of manufacture.

The flanges P, as here shown, rest in circular recesses $a$, made in blocks of insulating material T, which are applied to the edges of the pole-pieces instead of in similar recesses formed in the edges of the pole-pieces themselves. This is simply an incident of the particular construction here shown due to the lead of the circuit chosen. It should of course be understood that I may dispense with the blocks T and form the recesses $a$, as first described, directly in the pole-pieces B B', and if it be desired to insulate the bridges O O', or either of them, from said pole-pieces I may accomplish that result in any other of the known methods which will readily occur to electrical workmen and others skilled in the art.

Surrounding the pivot-pins K K' are tight washers or rings U U', to which rings are fastened the inner ends of coiled springs V V'. The outer ends of springs V V' are held in arms W, which are secured to the insulating-blocks T.

The sleeves R extend beyond the inner faces of the bridges O O', and receive upon them rings Y Y', which rings carry arms Z Z'. On each arm are pins $c\ c'$, Fig. 5, between which pins the coiled spring is received, as shown best in Fig. 3. The rings Y Y' are a close fit upon the sleeves R, but may be turned on said sleeves. In this way the arms Z Z' may be operated as moving abutments for said springs, and may be adjusted so as to lengthen or shorten the active part of said springs by simply moving them to the right or left at will.

To the pivot-pin K is secured a light needle, $d$, which extends over a plate, $l$, upon which is inscribed a scale of regular divisions.

Directly in front of the polar extremities of magnet A is a bar, $g$, of iron or other magnetic material, which, by means of the adjusting-screw $h$, may be moved at will nearer to or farther from said extremities of the magnet. In the case $e$ of the instrument I arrange a series of resistance-coils, as $f\ f'\ f''$, constructed to offer different resistance to the passage of a current through them. The three coils here shown, for example, may have resistances, respectively, of ten, one hundred, and one thousand ohms. The coils are connected to plates $z\ z'\ z''$ at one end, and their opposite terminals are united and connected to a plate, $z'''$. Electrical connection between the plates $z\ z'\ z''$ may be established with a plate, $a'$, by the insertion of metal plugs in the openings $j\ j'\ j''$. By suitably inserting plugs the current may be caused to traverse any coil or coils.

In Fig. 1 the three resistance-coils $f\ f'\ f''$ are represented in multiple-arc relation in the shunt-circuit between posts 1 and 2. In the diagram Fig. 7 they are indicated in series in the same circuit. In the latter case the arrangement is similar to that well known in resistance-boxes, each coil having its own plug, which on removal causes the current to traverse the coil. Either of the above arrangements of the resistance-coils may be employed. I prefer that illustrated in Fig. 1.

The main circuit in the instrument proceeds as follows: From the binding-post 1 on the baseboard to bridge O, arm Z, spring V, ring U, pin K, plate L, coil H, plate L', pin K', ring U', spring V', arm Z', bridge O', and binding-post 2. The resistance-coils $f\ f'\ f''$ are in multiple arc with the main circuit traced above as follows: By wire $k$ from binding-post 1 to plate $a'$, through the plates $z\ z'\ z''$, or either of them, to the resistance-coils $f\ f'\ f''$, or either of them, and thence to plate $z'''$, to wire $k'$, and so to binding-post 2.

I will now describe the operation of the instrument. The coil H is an assemblage of parallel loops in the circuit. The whole space occupied by a loop when a current traverses the wire behaves, as is well known, like a magnetic shell—that is, as if the loop and inclosed space were simply a magnet in slab form, one face of the magnet exhibiting north and the other face south polarity. Thus in Fig. 4 the face turned toward the observer and comprising all that area included within the frame J might be of one polarity, while the face turned from the observer, and likewise included within said frame, might be of the other polarity. Now, the polarity of either face of the coil will depend upon the direction of the current circulating in the coil, so that, for example, if the current circulated through the coil from pin K to pin K' the face turned to the observer in Fig. 4 might show north polarity, while if the current moved from pin K' to pin K that same face might show south polarity. If, then, the coil H is placed in proximity to a magnet, it will act when the current is traversing it with reference to that magnet just as any other magnet would act—that is, if the face of the coil in proximity to a given pole of the magnet is of like polarity the poles of the magnet and face of the coil will mutually repel; and equally, if the face of the coil and pole of the magnet be of unlike polarity, they will mutually attract. If, however, the magnet be fixed and immovable and the coil be freely suspended and movable, then the coil alone will be attracted to or repelled from the magnet-pole, as the case may be.

Referring now to the permanent magnet A, it will be observed that I have so arranged that magnet and its pole-pieces B B' as to produce a very intense field of force in the cylindrical space between said pole-pieces. I have also placed in the center of this field a mass of inductive metal, the cylinder G, which acts to draw the lines of force into itself; or, in other words, to prevent their diverging or straying into regions outside of the intense limited field, which is desired. In this field I delicately poise the coil H, so that it is free to vibrate on its pivot-pins K K', but not completely to rotate, for the pin F, which supports the cylinder G, will of course prevent complete rotation of the coil around the cylinder.

Now, suppose that the coil be so adjusted in the field that its normal position is that represented in Fig. 1, dotted lines, or in Fig. 6, full lines, when no current is flowing. Suppose, further, that the left-hand pole-piece, B, be of north polarity and the right-hand pole-piece, B', be of south polarity. Suppose, also, that the current circulating in the coil move in such direction that the face of the coil opposite the north-pole piece be of south polarity and the face of the coil opposite the south-pole piece be of north polarity, as indicated by the letters S N in Fig. 6. The result will be that the north pole of the permanent magnet will attract the south side of the coil and the south pole of the magnet the north side of the coil, and the attraction of the two poles will act as a couple, tending to turn the coil on its pivots in the direction of the arrow, Fig. 6, until the coil has traversed half its path, or an angle of forty-five degrees. Then the north side of the coil will be opposed to the north pole of the magnet and the south side of the coil to the south pole of the magnet, and repulsion will follow, which, however, will tend to move the coil still in the same direction, so that the coil will finally assume a position at an angle of ninety degrees from its original position, as indicated by the dotted lines in Fig. 6. If no resistance whatever were opposed to the movement of the coil, then, theoretically, any current which would polarize it, as above described, would cause it to travel from one extreme limit of its path to the other; but if to the motion of the coil a constant resistance is opposed always directly proportional, or nearly so, to the extent of its travel, then the coil will move only to a point at which equilibrium exists between the force which moves it and the force which opposes its motion. Now, the force which tends to move the coil is due to the current which passes through it, and the magnitude of this force depends upon the strength of the magnet-poles, upon the length of wire in the coil, and upon the strength of the current. The magnet A being a permanent magnet and the field of force between its poles being concentrated and exceedingly intense, the strength of this field may be regarded as constant. So, also, the length of wire in the coil is constant. Consequently the magnitude of the moving force is directly proportional to the current strength. The opposing force to the movement of the coil is the resiliency of the coiled springs V V', which are wound up, so to speak, as the coil turns. This resistance is also a constant force and directly proportional to the extent of movement of the coil. Therefore the only variable force will be that of the strength of the current, and the extent of movement of the coil will measure this strength, because the coil will come to rest at a point where the resistance of the spring and the moving force of the current balance. This extent of movement is conveniently shown by the traverse of the needle $d$, attached to the coil-pivot K over the graduated scale, which scale may be uniformly divided into regular intervals, because, as already stated, for twice the current strength the coil will move over double the distance, and so on proportionally to the limit of its possible travel.

I design this instrument for the measurement of current strength, and its organization and construction are such that it may be connected and left in circuit with the dynamo or other generator. To this end I provide the shunt-circuit, which includes the resistance-coils $f$ $f'$ $f''$, through which circuit and the main circuit through the coil H the current divides. The known resistance in the shunt is to be low compared with the resistance of the coil-circuit, so that the greater part of the current may flow through the resistance-coils and the less part through the coil H. The proportion of the total current passing through the coil H is to be such as will not be sufficient to endanger the coil or other parts of the instrument in circuit if continuously maintained, and the strength of this part of the current will be directly indicated by the position of the needle on the graduated scale. In order to find the strength of the whole current, it is necessary simply to multiply the ampère strength indicated by the needle by the multiplying power of the shunt. Thus, if, for example, the main circuit resistance through the coil H is one hundred ohms, and the shunt-resistance ten ohms, the multiplying power of the shunt will be $\frac{10 + 100}{10} = 11$. If under these conditions the needle points to the division 10 on the scale, the total strength of the current traversing the instrument will be one hundred and ten ampères.

It will be apparent that the sole factor which operates to move the needle is current strength, and that I simply weigh this current strength against the constant resilient resistance offered by the springs. If the current strength is greater, the coil will move a greater distance, and so compress the spring more before a balance is reached. If it be less, then the coil will move a less distance, and so compress the spring less before equilibrium results. By means of a shunt-circuit of known resistance I can cause a fractional current of known percentage to pass through the moving coil, so that I can produce relatively as great deflections of the needle in the measurement of currents of low strength as in that of currents of high strength, the multiplying-power of the shunt only being changed. Of course the resistances in the shunt-circuit of any given instrument must be selected in accordance with the capabilities which it is desired that the apparatus shall possess with reference to the maximum strength measured. Thus, if, for example, with the whole current diverted through the coil H, the needle will traverse the entire scale under a strength of ten ampères, it follows that for the measurement of currents of greater strength the resistances must be proportioned so as to permit a current, or, rather, a fractional part of the whole current not in excess of ten ampères, to traverse the coil. If, then, with three resistance-coils, respectively of ten, one hundred, and one thousand ohms, and an instrument-resistance of one hundred ohms, in which case the multiplying-powers of the shunt would be eleven, twenty, and one hundred and ten, it will be evident that a needle deflection of ten degrees on a scale of one hundred divisions will represent one ampère, eleven ampères, twenty ampères, or one hundred and ten ampères.

It will be obvious that inasmuch as only a fraction of the current is under ordinary conditions allowed to pass through the coil H the instrument may be left in circuit with the generator without danger.

I have already stated that the strength of the field of the permanent magnet is a factor in determining the influence of the current upon coil H, and that this is practically a constant. In order, however, to secure a means of altering the strength of this field, I provide the movable bar or keeper $g$, which, as has been stated, may be advanced nearer to or farther from the poles of the magnet by the adjusting-screw W. When the bar $g$ is brought near to the field, a number of the lines of force will flow into said bar and out of the space between the magnet-poles, so weakening the field. Conversely, when the bar is retracted, less lines of force will flow into it, and hence the field will be stronger by the accession thereto of these lines of force. It is also desirable to provide a means of adjusting the resiliency of the springs V V', so as to be able to set with reference to the scale the points of equilibrium of current and springs. This I accomplish by the movable arms Z Z', which, as I have stated, when moved in one direction, shorten the springs and in the other direction lengthen them—in one case reducing in the other increasing the elasticity of said springs, and hence modifying their resistance to the movement of coil H.

Referring now particularly to the coil H, it has already been stated that said coil is wholly inclosed in an envelope of copper or other diamagnetic metal, the parts of said envelope being the outer frame, J, inner frame, I, and side plates, H'. The entire envelope may be made of a single piece of copper without joints by electro-deposition. A coil having an envelope thus made forms the subject-matter of another application for Letters Patent, filed by me April 9, 1888, and serially numbered 270,093. The longitudinal faces of the frame J are rounded or convex, so as to conform to the curve of the concavities in the pole-pieces B B', and the similar faces of the frame I are rounded or concave, so as to conform to the curve of the cylinder G. It will also be observed from Fig. 4 that the frame J is made thicker than the frame I. The object of this construction is as follows: It is a well-known fact that when a body of diamagnetic metal—such as copper—is suspended between the poles of a powerful magnet it finds in the field of force a powerful resisting medium, which opposes any motion of the metallic mass and speedily brings it to rest. I propose to utilize this phenomenon in order to prevent undue oscillation of the coil H, which, as already explained, is inclosed in and so has rigidly connected to it a mass of copper; or, in other words, to render the instrument "dead beat," the needle simply moving to the point on the scale corresponding to the number of volts electro-motive force of the current and remaining there. The moving mass of copper in the strong magnetic field acts very much like the moving piston in the mechanical dash-pot containing water, oil, or glycerine; and, in fact, I may term the device a magnetic or electrical "dash-pot." In order to secure more effective results, I distribute the mass of copper in greatest proportion in the thick outer frame, J, which, being nearest to the poles of the permanent magnet, is necessarily in the strongest part of the field. So, also, said frame is farthest from the center of motion of the coil, and hence any retarding force there applied exercises the greatest possible leverage upon the coil. In practice I make the dimensions of the frame J such that it will just clear the faces of the pole-pieces B B' and the dimensions of the frame I, so that it will just clear the periphery of the cylinder G. The result is that the coil-cylinder and magnet-poles so closely approximate that I have substantially a closed magnetic circuit between the magnet-poles at all times, coil and cylinder, in fact, becoming a keeper or armature for the magnet always in place and serving the purpose of preventing loss of strength of the magnet and of keeping its energy in constant activity. The coil H and diamagnetic metal united thereto being in the field of a permanent magnet is in a field everwhere uniform; hence the dampening effect of the copper is the same in all positions of the coil. It will also be noted that the coil turns wholly within the circle partly completed by the concave faces of the pole-pieces; hence in all positions of the coil the whole of it is in the field, no portion extending into the adjacent space.

I claim—

1. A magnet, an electrical conductor in coil or loop form supported and vibrating in the field of force of said magnet, a resilient body interposed between said coil and an abutment, and an electrical resistance in multiple-arc circuit with the terminals of said coil, substantially as described.

2. A magnet, an electrical conductor in coil or loop form supported and vibrating in the field of force of said magnet, a resilient body interposed between said coil and an abutment, and a variable electrical resistance in multiple-arc circuit with the terminals of said coil, substantially as described.

3. A magnet, an electrical conductor in coil or loop form supported and vibrating in the field of force of said magnet, a resilient body interposed between said coil and an abutment, and in multiple-arc circuit with the terminals of said coil a body of less electrical resistance than that of said coil, substantially as described.

4. A magnet, an electrical conductor in coil or loop form supported and vibrating in the field of force of said magnet, a resilient body interposed between said coil and an abutment, and two or more bodies of different electrical resistances disposed in multiple-arc circuit with the terminals of said coil, substantially as described.

5. The combination, with the case $e$, permanent magnet A, having inwardly-rounded or concave opposite polar faces, bridge-pieces O O', coil H, having its axis K K' entering bearings in said bridge-pieces, coiled spring V, connected to said axis of said coil and to an abutment, W, the said coil being in main circuit, of a circuit in multiple arc with the terminals of said coil, including resistances, as $f\,f'\,f''$, and arranged in the case $e$, substantially as described.

EDWARD WESTON.

Witnesses:
PARK BENJAMIN,
EDGAR GOODWIN.